(12) United States Patent
Toia et al.

(10) Patent No.: US 6,521,014 B2
(45) Date of Patent: Feb. 18, 2003

(54) NON-EVAPORABLE GETTER ALLOYS

(75) Inventors: Luca Toia, Carnago (IT); Claudio Boffito, Rho (IT)

(73) Assignee: SAES Getters S.p.A., Lainate (IT)

( * ) Notice: Subject to any disclaimer, the term of this patent is extended or adjusted under 35 U.S.C. 154(b) by 0 days.

(21) Appl. No.: 10/031,908

(22) PCT Filed: May 28, 2001

(86) PCT No.: PCT/IT01/00269

§ 371 (c)(1),
(2), (4) Date: Jan. 17, 2002

(87) PCT Pub. No.: WO01/92590

PCT Pub. Date: Dec. 6, 2001

(65) Prior Publication Data

US 2003/0007883 A1 Jan. 9, 2003

(30) Foreign Application Priority Data

May 30, 2000 (IT) .................................. MI2000A001200

(51) Int. Cl.⁷ ................................................ C22C 16/00
(52) U.S. Cl. ........................ 75/245; 252/181.6; 420/422
(58) Field of Search ............................ 75/245; 420/422; 252/181.6

(56) References Cited

U.S. PATENT DOCUMENTS

| | | | | |
|---|---|---|---|---|
| 4,312,669 A | * | 1/1982 | Boffito et al. | |
| 4,996,002 A | * | 2/1991 | Sandrock et al. | ........ 252/181.6 |
| 5,456,740 A | * | 10/1995 | Snow et al. | |
| 5,961,750 A | * | 10/1999 | Boffito et al. | |

* cited by examiner

*Primary Examiner*—Ngoclan Mai
(74) *Attorney, Agent, or Firm*—Perkins Coie LLP

(57) ABSTRACT

Non-evaporable getter alloys containing zirconium, vanadium, iron, manganese and one or more elements selected among yttrium, lanthanum and Rare Earths are described, having improved features of gas sorption, particularly of nitrogen, with respect to the known getter alloys.

25 Claims, 9 Drawing Sheets

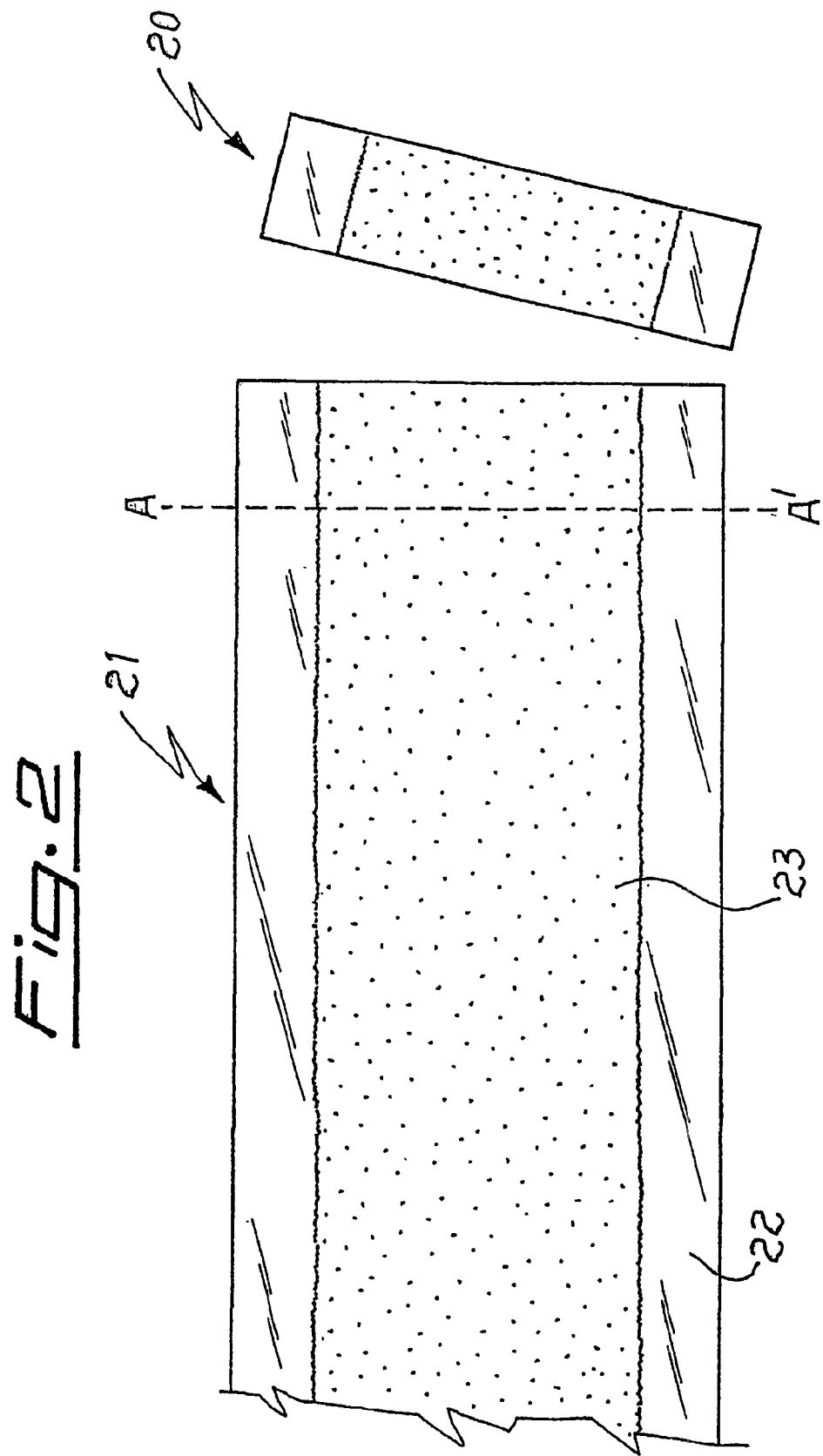

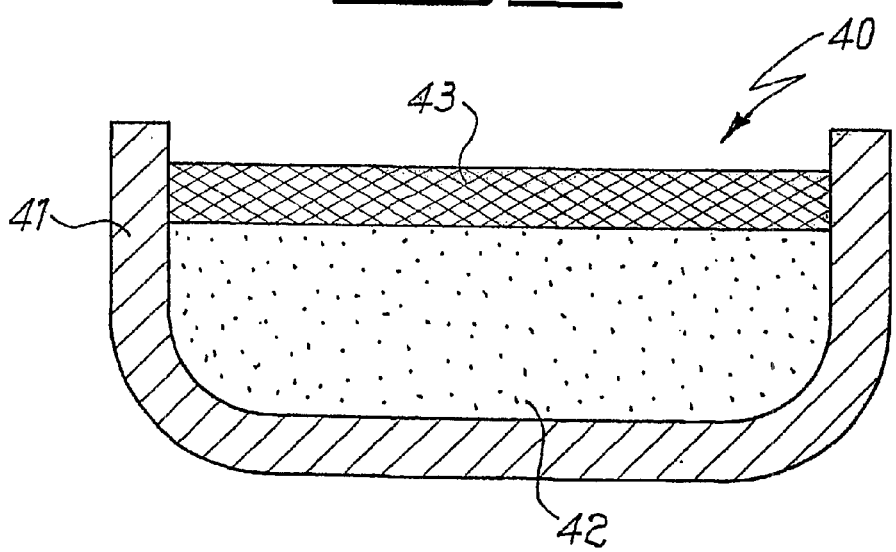
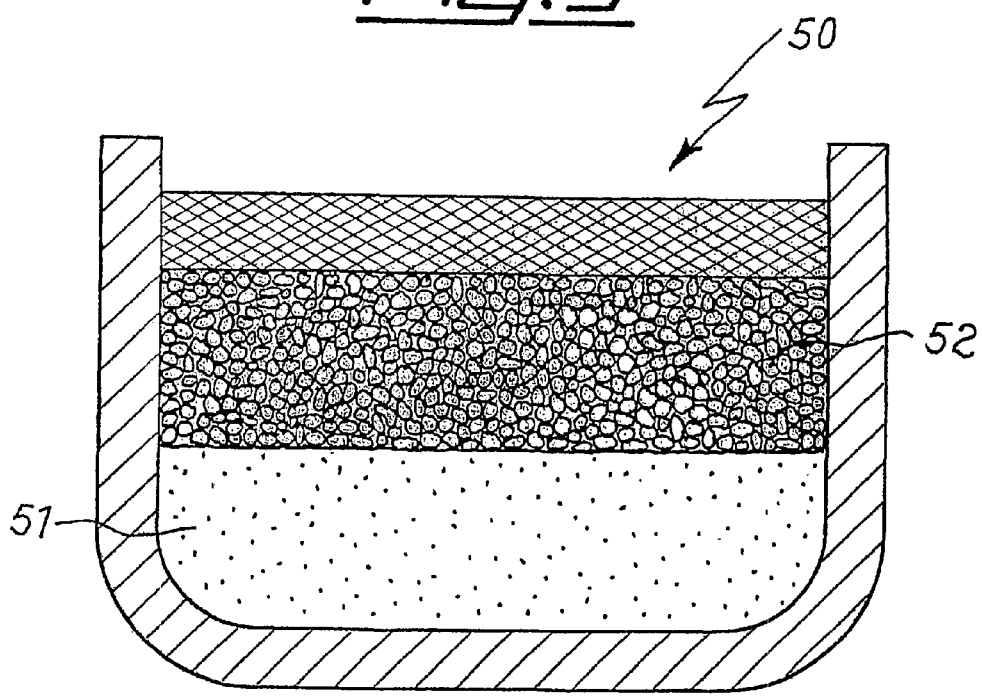

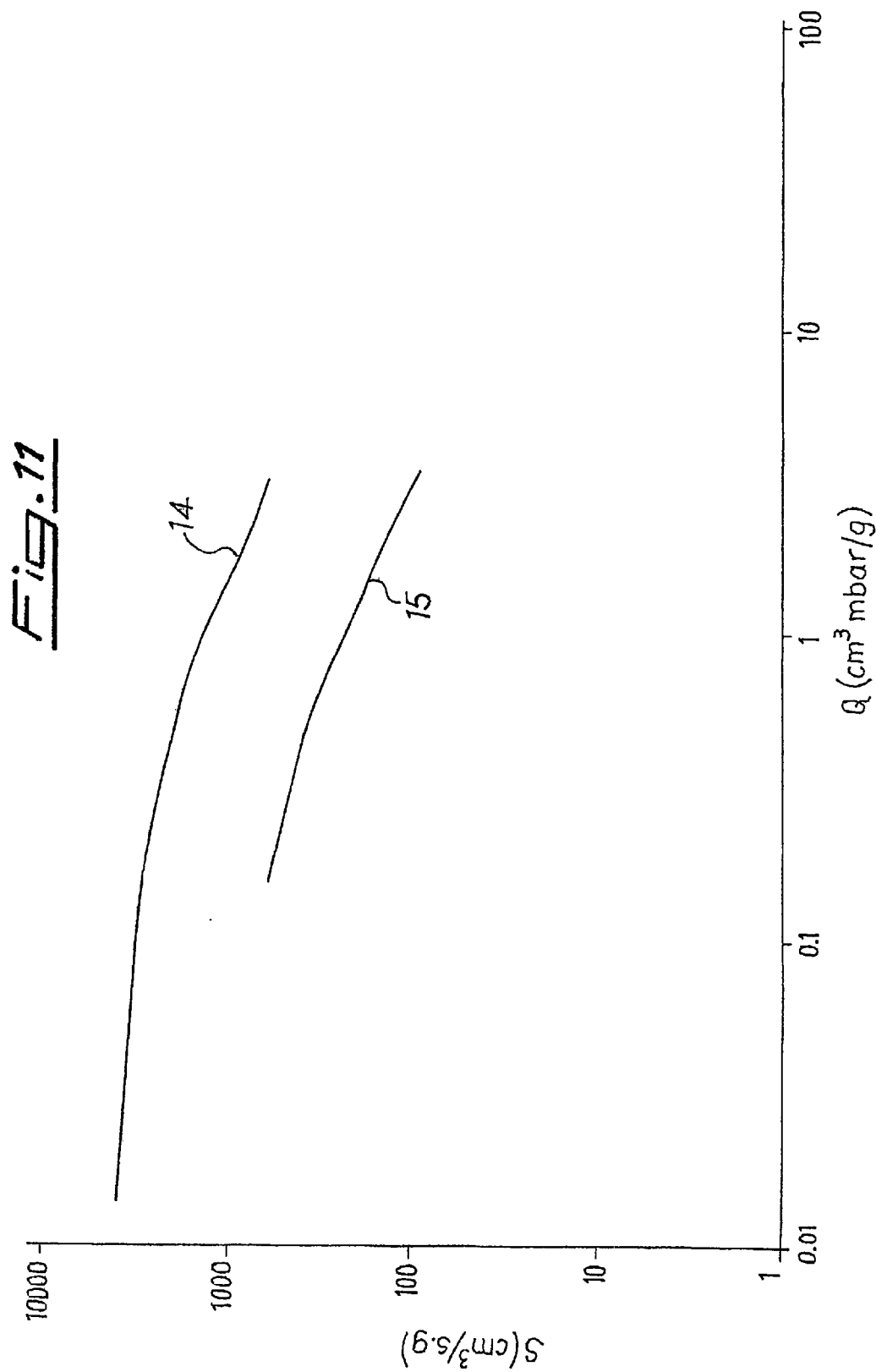

NON-EVAPORABLE GETTER ALLOYS

The present invention relates to non-evaporable getter alloys.

Particularly, the invention relates to non-evaporable getter alloys which provide for a high efficiency in the sorption of gases, particularly of nitrogen.

Non-evaporable getter alloys, also known as NEG alloys, can sorb hydrogen in a reversible way and gases such as oxygen, water, carbon oxides and, in the case of some alloys, nitrogen, irreversibly.

A first use of these alloys is vacuum maintenance. Vacuum maintenance is requested in the most various applications, for example in particles accelerators, in X-rays generator tubes, in flat displays of the field emission type and in thermally insulating evacuated interspaces, such as in thermal bottles (thermos), in Dewars or in the pipings for oil extraction and transportation.

The NEG alloys can also be used for removing the above mentioned gases when they are present in traces inside other gases, generally noble gases. An example is the use in lamps, particularly the fluorescent ones which are filled with noble gases at pressures of a few tens of millibars, wherein the NEG alloy has the purpose of removing traces of oxygen, water, hydrogen and other gases, thus maintaining the suitable atmosphere for the lamp functioning; another example of removal of traces of the cited gases from other gases is the purification of inert gases, in particular for applications in microelectronic industry.

Generally these alloys have zirconium and/or-titanium as main components and comprise one or more elements selected among transition metals or aluminum.

NEG alloys are the subject matter of several patents. U.S. Pat. No. 3,203,901 discloses Zr—Al alloys, and in particular the alloy having weight percent composition Zr 84%-Al 16%, manufactured and sold by the applicant under the name St 101; patent U.S. Pat. No. 4,071,335 discloses Zr—Ni alloys, and in particular the alloy having weight composition Zr 75.7%-Ni 24.3%, manufactured and sold by the applicant under the name St 199; U.S. Pat. No. 4,306,887 discloses Zr—Fe alloys, and particularly the alloy having weight percent composition Zr 76.6%-Fe 23.4%, produced and sold by the applicant under the name St 198; U.S. Pat. No. 4,312,669 discloses Zr—V—Fe alloys, and in particular the alloy having weight composition Zr 70%-V 24.6%-Fe 5.4%, manufactured and sold by the applicant under the name St 707; U.S. Pat. No. 4,668,424 discloses zirconium-nickel-mischmetal alloys, with optional addition of one or more transition metals; U.S. Pat. No. 4,839,085 discloses Zr—V—B alloys, wherein E is an element selected among iron, nickel, manganese and aluminum or a mixture thereof, U.S. Pat. No. 5,180,568 discloses intermetallic compounds $Zr_1M'_1M''_1$, wherein M" and M", either alike or different, are selected among Cr, Mn, Fe, Co and Ni, and in particular the compound $Zr_1Mn_1Fe_1$ manufactured and sold by the applicant under the name St 909; U.S. Pat. No. 5,961,750 discloses Zr—Co—A alloys, wherein A is an element selected among yttrium, lanthanum, Rare Earts or a mixture thereof, and particularly the alloy having weight composition Zr 80.8%-Co 14.2%-A 5%, produced and sold by the applicant under the name St 787; finally, getter alloys based on Zr and V for use in gas purifiers are described in various patent applications published in the name of the firm Japan Pionics, among which for example the applications Kokai 5-4809, 6-135707 and 7-242401.

NEG alloys have different properties according to their composition. For example, the alloy St 101 is, among those mentioned, the best one as long as hydrogen sorption is concerned, but requires, for working, an activation treatment at relatively high temperatures, of at least 700° C.; the alloy St 198 has poor nitrogen sorption properties, therefore it is employed for the purification of this gas; the compounds described in U.S. Pat. No. 5,180,568 do not sorb hydrogen As a result of these behavior differences, the choice of the NEG alloy to be employed depends on the specific foreseen application. In particular, it may be stated that, among these, the most largely used is the one named St 707, as described in U.S. Pat. No. 4,312,669, thanks to its good sorption qualities, in particular for hydrogen, and to the relatively low activation temperature required by this NEG alloy.

Removal of atmospheric gases is important in some applications. This is for example the case of the thermal insulation, wherein the gases which remain in the evacuated interspace during the manufacture have to be removed: as a matter of fact, in order to maintain the production costs within acceptable limits, the pumping of the interspace which is carried out before the sealing thereof is generally interrupted after a fixed time, generally leaving a residual pressure, although limited, in the interspace itself. The sorption of the atmospheric gases is also requested in the currently studied application of the energy inertial accumulators, better known with the definition "fly wheels", which work on the principle of rotating an object of high mass at high speed in an evacuated chamber, vacuum is necessary in this application in order to prevent the rotating mass from losing energy because of the friction with the gases present in the chamber. In these applications, particularly important for the choice of the NEG alloys is the behavior towards nitrogen, both because this gas forms about 80% of the composition of the atmosphere, and because it is the one, among atmospheric gases (with the exception of the noble gases), which is removed by the NEG with the highest difficulty.

The industrial application which currently requires the highest efficiency of undesired gases removal is purification of gases for the semiconductor industry. As a matter of fact, it is known that impurities in the process gases can be incorporated into the layers which form the solid state devices, thus causing electronic defects in them and therefore production rejects. The degrees of purity which are presently requested by the semiconductor industry are of the order of the ppt ($10_{-12}$ in atoms or molecules). Therefore, the availability of NEG alloys having very high efficiency of impurity sorption is necessary; as above noted, nitrogen is, among gases which represent the normal impurities in a process gas, the one which is removed with the highest difficulty from the NEG alloys.

Object of the present invention is therefore providing non-evaporable getter alloys having high gas sorption efficiency, particularly nitrogen.

This object is obtained according to the present invention by non-evaporable getter alloys comprising zirconium, vanadium, iron, manganese and at least one element selected among yttrium, lanthanum and Rare Earths, having a percent composition of the elements variable within the following ranges (in the rest of the text, all percentages and ratios are by weight, unless otherwise specified):

zirconium from 60 to 85%;

vanadium from 2 to 20%;

iron from 0.5 to 10%;

manganese from 2.5 to 30%; and yttrium, lanthanum, Rare Earths or mixtures thereof from 1 to 6%.

The invention will be described in the following with reference to the drawings, wherein:

FIGS. 1 to 5 show various different embodiments of getter devices using the alloys of the invention;

FIGS. 6 to 11 show the results of gas sorption tests under various conditions by the alloys of the invention and a reference alloy.

Figure 1:
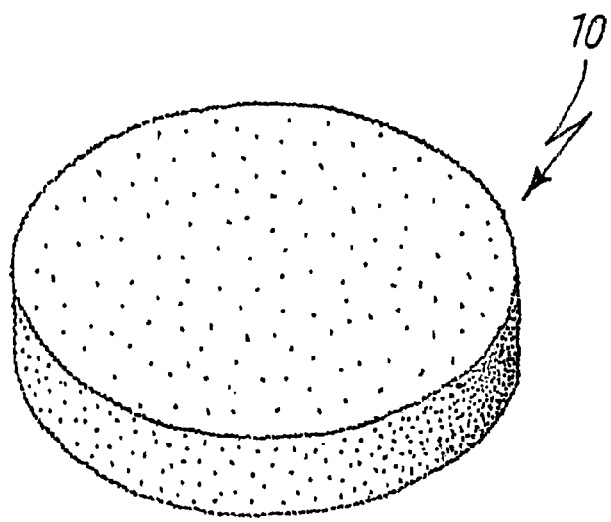

The alloy according to the invention differ from the alloys known from U.S. Pat. No. 4,312,669 because of the lower content of vanadium and iron, which are replaced by manganese and one element among yttrium, lanthanum and Rare Earths; from the alloys of U.S. Pat. No. 4,668,424 because these do not involve the use of vanadium and of manganese, and require instead the presence of nickel in quantities between 20 and 45% by weight; from the alloys of U.S. Pat. No. 4,839,085 because these do not require the use of yttrium, lanthanum or Rare Earths and contain generally, with respect to the alloys of the invention, higher quantities of vanadium and lower quantities of iron and manganese; from the compounds of U.S. Pat. No. 5,180,568, because these are ternary intermetallic compounds $Zr_1M'_1M''_1$ which do not contain vanadium or yttrium, lanthanum and Rare Earths; and from the alloys of U.S. Pat. No. 5,961,750 which require the presence of cobalt and do not require the presence of vanadium iron and manganese. As above mentioned and widely described in the following, these differences in the composition result in notable differences in the gas sorption, particularly as far as nitrogen is concerned.

With zirconium contents lower than 60%, the performances of gas sorption of the alloys of the invention decrease, whereas contents of this element higher than 85% cause the alloys to be too plastic and difficult to work in the production of getter devices. The contents of other components of the alloys which are outside the indicated percentages generally involve reductions of the gas sorption features, particularly of nitrogen in the case of high vanadium contents and of hydrogen for high iron or manganese contents. Further, it has been found that alloys containing vanadium less than 2% are too pyrophoric and therefore dangerous to be produced and handled. Finally, percentages higher than 6% of yttrium, lanthanum, Rare Earths or mixtures thereof do not improve the sorption features of the alloys, but cause them to be unstable in the air with resulting problems of storage before use. Particularly convenient for the invention is the use, instead of the last mentioned elements, of mischmetal (also indicated simply MM in the following). Various commercial mixtures are identified with this name, comprising above all cerium, lanthanum and neodymium, and minor quantities of other Rare Earths, of lower costs with respect to the pure elements. The exact composition of the mischmetal is not important, because the above mentioned elements have similar reactivities, so that the chemical behavior of the different available types of mischmetals is essentially constant even if the content of the single elements is varied, so that the exact composition of this component does not have an influence over the working features of the alloys according to the invention.

Within the indicated ranges, are preferred the alloys having a content of:

zirconium varying between about 65 and 75%, and, even more preferably between about 67 and 70%;

vanadium 2.5 to 15%;

manganese 5 to 25%;

iron/vanadium ratio comprised between 1:4 and 1:5.

Particularly preferred among the alloys of the invention are an alloy having composition Zr 70%-V 15%-Fe 3.3%-Mn 8.7%-MM 3% and an alloy of composition Zr 69%-V 2,6%-Fe 0.6%-Mn 24.8%-MM 3%.

The alloys of the invention can be prepared by fusion in an oven starting from pieces or powders of the component metals, taken in proportions corresponding to the final desired composition. The techniques of fusion in an arc oven under an inert gas atmosphere, for instance under a pressure of 300 mbars of argon; or in an induction oven, under vacuum or an inert gas are preferred. It is anyway possible the use of other techniques for the preparation of alloys which are usual of the metallurgical industry.

In practical applications, the alloys of the invention are used in the form of pellets of the getter material alone or on a support or inside a container. In any case, the use of alloys in the form of powders having particle size generally lower than 250 $\mu$m and preferably between 125 and 40 $\mu$m is preferred. With larger particle size an excessive reduction of the specific surface of the material (surface area per weight unit) takes place, whereas particle size values lower than 40 $\mu$m, although can be used and requested for some applications, cause some problems in the production steps of the getter devices (thin powders are more difficult to be moved by automatized means and are more pyrophoric with respect to powders having larger particle size).

The NEG alloys of the invention can be activated at temperatures comprised between 300 and 500° C. for periods between 10 minutes and 2 hours. The effect of the temperature prevails over the treatment time, and an activation at 400° C. for 10 minutes allows to obtain a nearly complete activation Once activated, these alloys are able to work for the sorption of gases such as hydrogen, carbon oxide, and above all nitrogen, already at the room temperature, with properties similar to the known alloys for hydrogen and better ones for carbon oxide and nitrogen. Generally the maximum temperature of use is about 500° C., not to compromise the stability and functionality of the device wherein they are inserted. The optimal working temperatures of these alloys depend on the specific applications; for instance, in the case of the interspaces for thermal insulation the temperature is determined by that of the warmest wall of the insterspace itself, in the case of the "fly wheels" the temperature is the room temperature and in the purification of gases the temperature is generally between about 300 and 400° C.

In the case of hydrogen, as for all known NEG materials, the sorption is reversible so that the sorption features are evaluated in terms of equilibrium hydrogen pressure on the alloy as a function of the temperature and of the quantity of sorbed hydrogen. From this point of view the sorption of hydrogen by the alloys of the invention is very good, and similar to that of the mentioned alloy St 707, that is the most widely used getter alloy. The alloy of the invention also have at room temperature, with respect to the alloy St 707 in the same conditions, sorption capacity up to 15 times greater for nitrogen and up to 10 times greater for Co.

Figure 3:
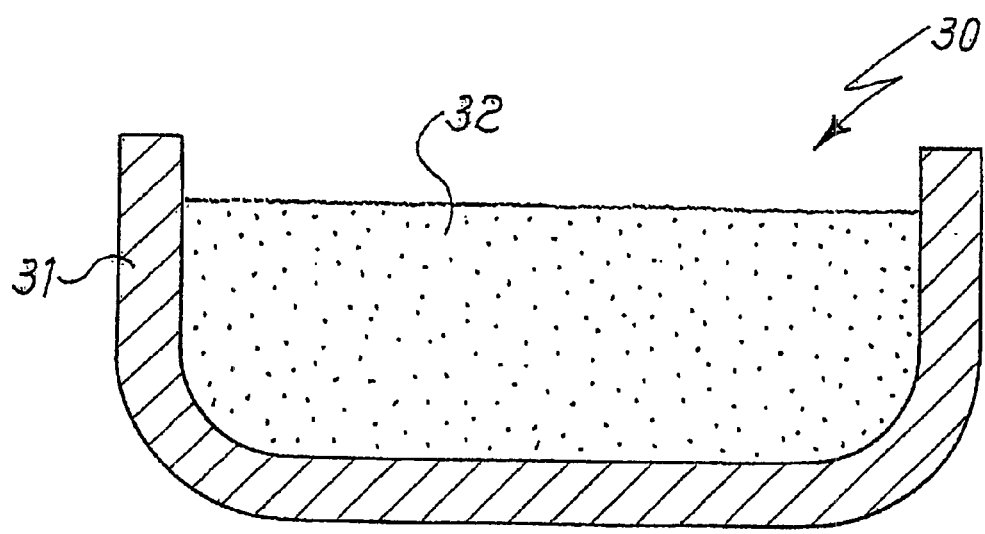

As already mentioned, the forms of the getter devices which can be prepared by using the alloys of the invention are the most various, comprising for example pellets formed only of powders of the getter alloy, or of these on a support, generally metallic. In both cases the consolidation of the powders can be carried out by compression or by compression followed by sintering. The pellets made only of compressed powders find an application for example in thermal insulation and in gas purifications. In the cases wherein the powders are supported, steel, nickel or nickel alloys can be used as support material. The support can be simply in the form of a band on the surface of which the powders of the alloy are adhered by cold rolling or by sintering after deposition by various techniques. Getter devices obtained from similar bands can be used in lamps. The support can also be formed of a proper container having various shapes, wherein the powders are inserted generally by compression, or even without compression in some devices wherein the container is provided with a porous septum, permeable to the passage of gases but able to retain powders; the latter configuration is particularly suitable for the application of the "fly wheels", wherein powder of a moisture sorber material, such as calcium oxide, can be additioned to the getter alloy. Some of these possibilities are represented in FIGS. 1 to 5, wherein FIG. 1 shows a pellet 10 made only of compressed powders of NEG alloy according to the invention. FIG. 2 represents a NEG device 20, having a shape particularly suitable for the use in lamps, obtained by cutting along parallel lines, orthogonal to the longitudinal direction, a band 21 formed of a metal support 22 on which powders 23 of an alloy of the invention are present; the next device of the type 20 is obtained by cutting the band along dotted line A–A'. FIG. 3 shows in section a device 30 formed of an upperly open metal container 31, wherein powders 32 of NEG alloy are provided. FIG. 4 shows in section a device 40 formed of a metal container 41 wherein powders 42 of a NEG alloy are provided, having an upper opening closed by a porous septum 43. Finally, FIG. 5 shows a device 50 similar to that of the preceding drawing and particularly suitable in the application "fly wheels", wherein powders of a NEG alloy 51 of the invention and powders of a moisture sorbing material 52 are provided.

The invention will be now further illustrated by means of the following examples. These non limiting examples show some embodiments which are intended to teach those skilled in the art how to put the invention into practice and to represent the best considered way for carrying out the invention.

EXAMPLE 1

This example relates to the preparation of an alloy of the invention. 100 g of an alloy having the composition Zr 70%-V 15%-Fe 3.3%-Mn 8.7%-MM 3% are produced by melting in an induction oven, in proportions corresponding to the desired composition, Zr, Mn, MM and a commercial V—Fe alloy containing about 81.5% by weight of vanadium. The mischmetal used has the weight percent composition of 50% cerium, 30% lanthanum, 15% neodymium, and the remaining 5% of other Rare Earths. The alloy ingot is ground under an argon atmosphere, in a pall mill and the powder is sieved, thus recovering the fraction having particle size of 40–128 µm.

EXAMPLE 2

This example relates to the preparation of a second alloy of the invention. The test of example 1 is repeated, but starting from different quantities of Zr, Mn, MM and V—Fe alloy, so as to obtain an alloy having composition Zr 69%-V 2.6%-Fe 0.6%-Mn 24.8%-MM 3%.

EXAMPLE 3 (COMPARATIVE)

This example relates to the preparation of an alloy according to the known art, to be used for example in the following examples; this alloy is taken as a reference because it is the NEG material which is most commonly used in application such as thermal insulation and gas purification. 100 g of St 707 alloy are produced, by operating as described in example 1, by using Zr and V—Fe alloy in proportions corresponding to the desired composition.

EXAMPLE 4

Figure 6:
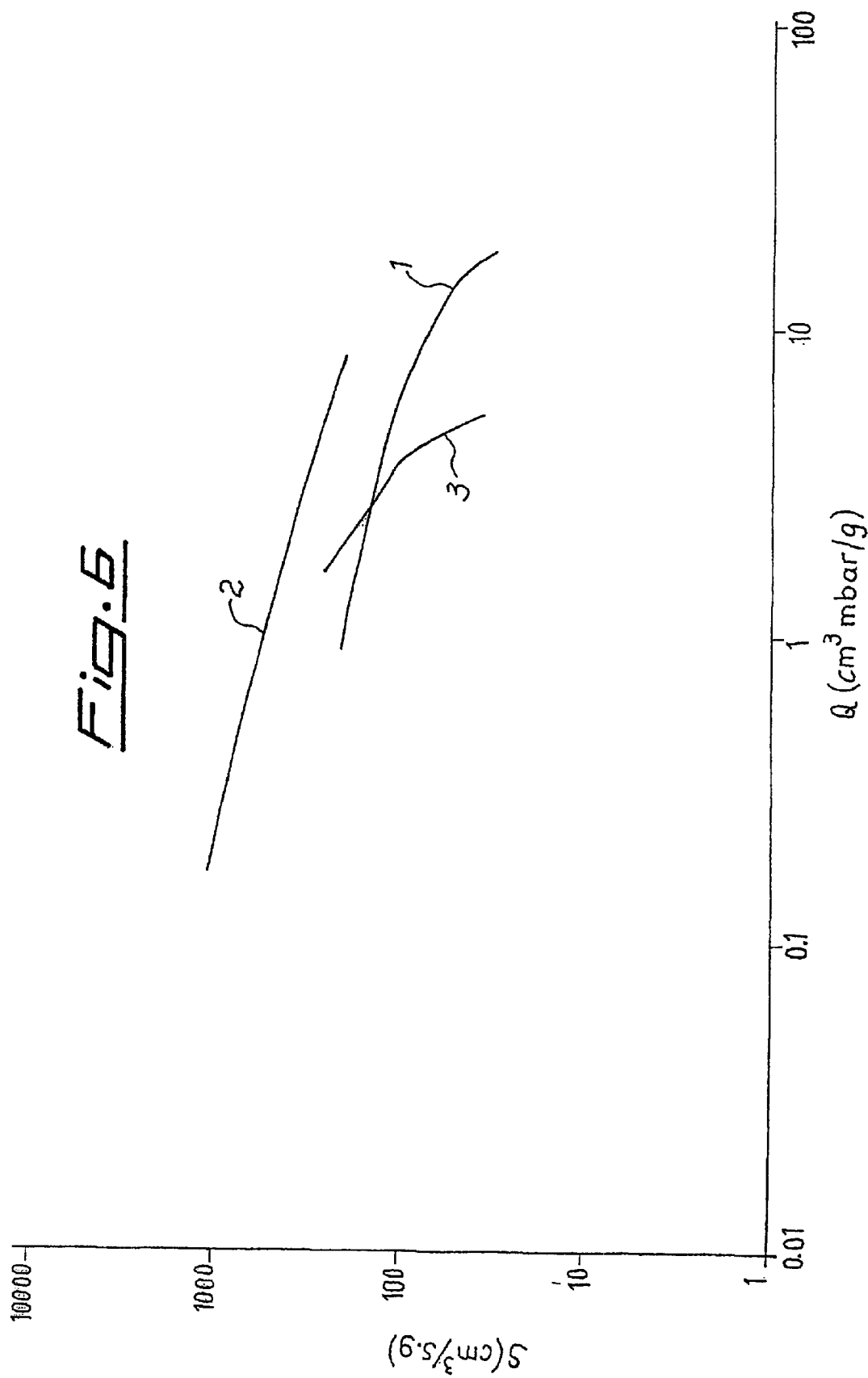

This example refers to a measure of the nitrogen sorption properties by an alloy of the invention 0.2 g of powder prepared in example 1 are activated at 500° C. for 10 minutes, and are then introduced in a measure chamber. The nitrogen sorption test is carried out by following the procedure described in standard ASTM F 798-82, by operating at the room temperature and with a nitrogen pressure of $4 \times 10^{-6}$ mbars. The test results are reported in a graphic as curve 1 in FIG. 6, as sorption velocity (indicated with S and measured in $cm^3$ of gas sorbed per second, normalized per gram of alloy) as a function of the quantity of sorbed gas (indicated with Q and measured in $cm^3$ of gas multiplied by the pressure of measure in mbars and normalized per gram of alloy).

EXAMPLE 5

The test of example 4 is repeated, by using 0.2 g of powder of example 2. The results of the test are reported in a graph as curve 2 in FIG. 6.

EXAMPLE 6 (COMPARATIVE)

The test of example 4 is repeated by using 0.2 g of powder of example 3. The test results are reported in a graph as curve 3 in FIG. 6.

EXAMPLE 7

Figure 7:
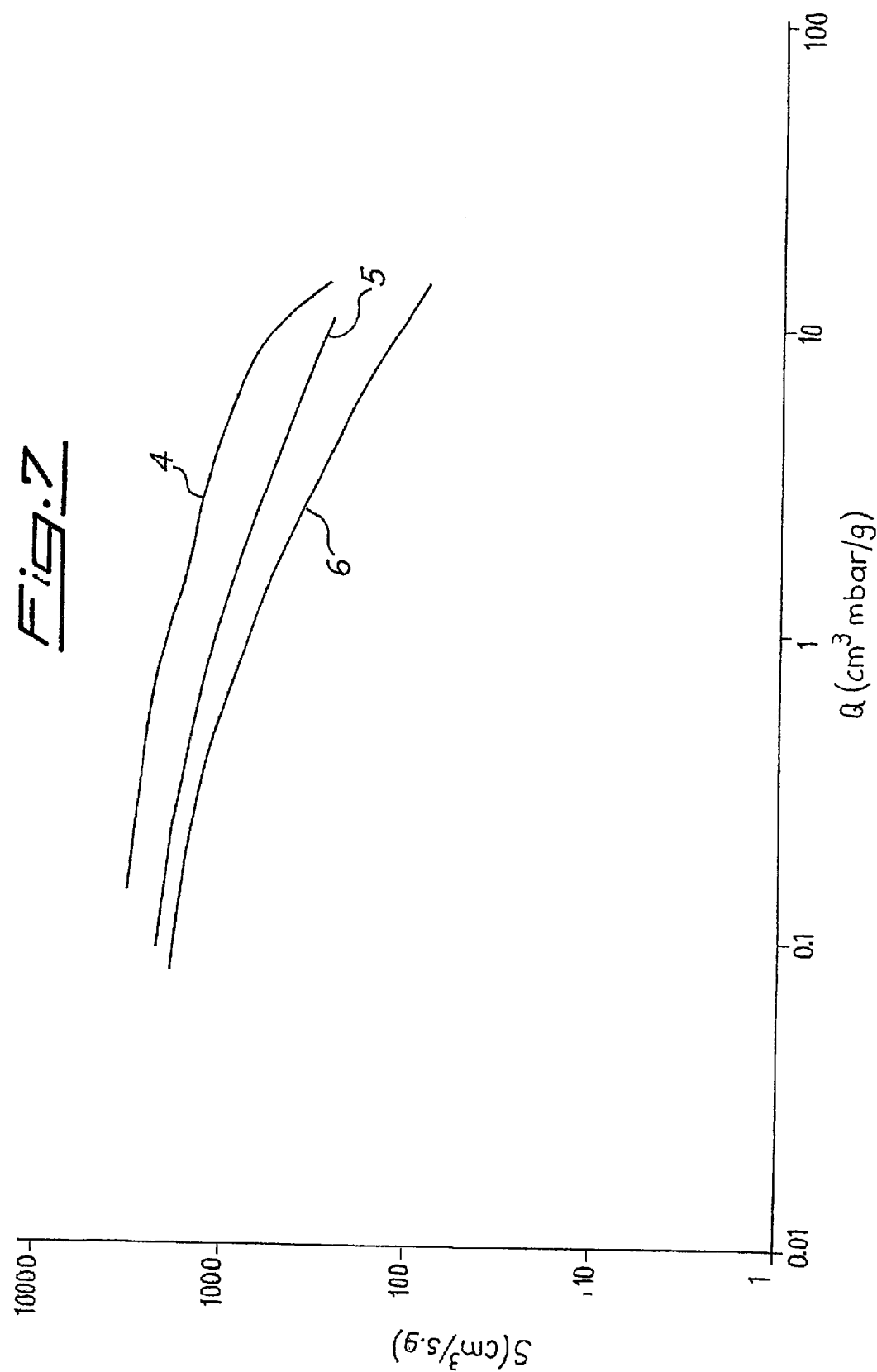

The test of example 4 is repeated, but using CO as the test gas. CO is used as the test gas because it is one of the gases which are found most commonly in evacuated spaces, such as the interspaces for thermal insulation The test results are reported in a graph as curve 4 in FIG. 7.

EXAMPLE 8

The test of example 7 is repeated by using 0.2 g of powder of example 2. The test results are reported in a graph as curve 5 in FIG. 7.

EXAMPLE 9 (COMPARATIVE)

The test of example 7 is repeated, by using 0.2 g of powder of example 3. The test results are reported in a graph as curve 6 in FIG. 7.

EXAMPLE 10

Figure 8:
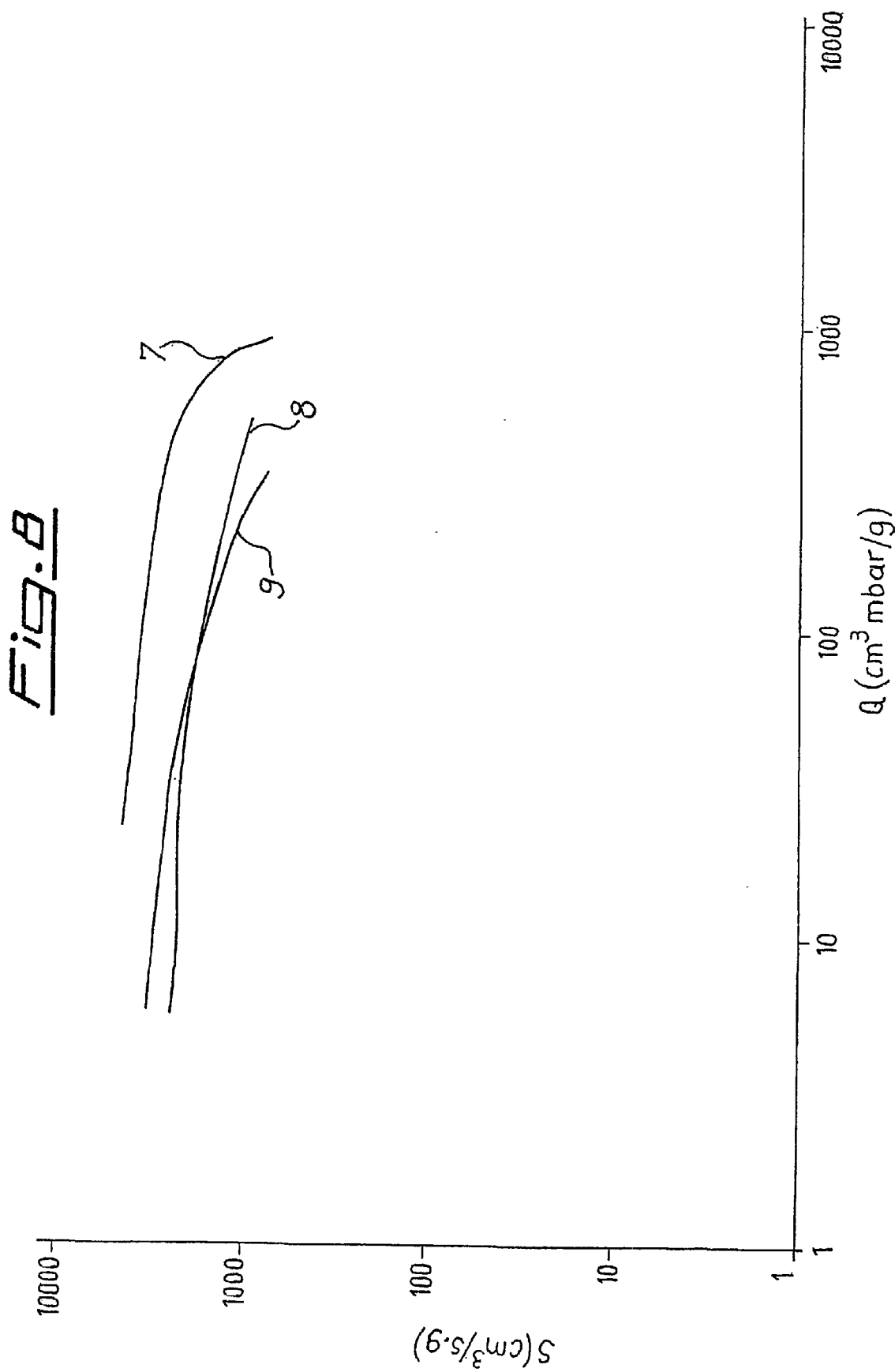

The test of example 4 is repeated, but using hydrogen as the test gas. Hydrogen, together with CO, is one of the gases present in greatest quantity in evacuated spaces. The test results are reported in a graph as curve 7 in FIG. 8.

EXAMPLE 11

The test of example 10 is repeated, by using 0.2 g of powder of example 2. The test results are reported in a graph as curve 8 in FIG. 8.

EXAMPLE 12 (COMPARATIVE)

The test of example 10 is repeated, by using 0.2 g of powder of example 3. The test results are reported in a graph as curve 9 in FIG. 8.

EXAMPLE 13

The test of example 4 is repeated, but maintaining in this case the sample at 300° C. during the test. The test results are reported in a graph as curve 10 in FIG. 9.

EXAMPLE 14 (COMPARATIVE)

The test of example 13 is repeated, by using 0.2 g of powder of example 3. The test results are reported in a graph as curve 11 in FIG. 9.

EXAMPLE 15

Figure 10:
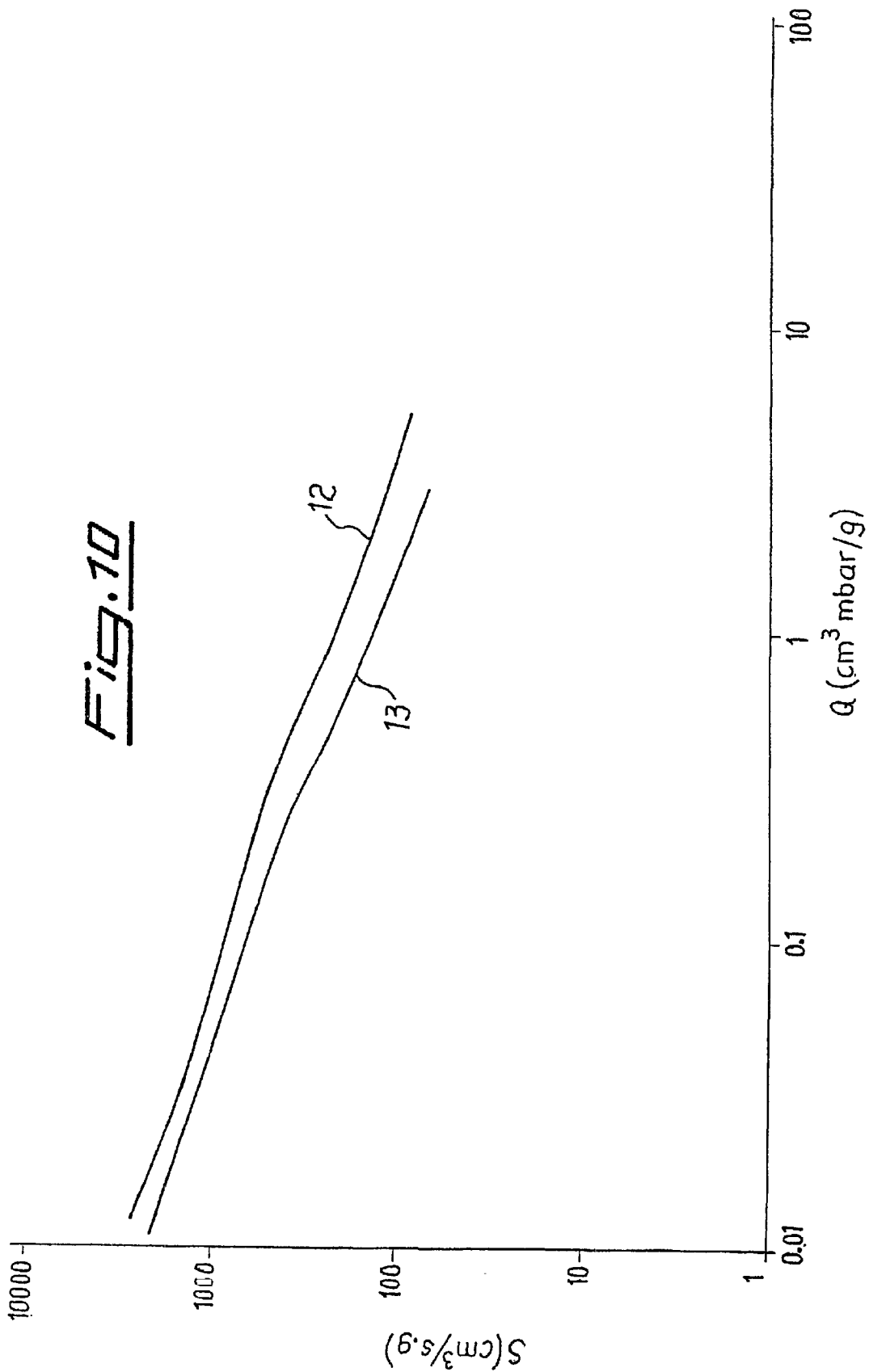

The test of example 4 is repeated, by using in this case, instead of loose powders, a 2 mm high pellet, having 4 mm of diameter and about 125 mg of weight, produced with the powder prepared as described in example 1. The results of the test are reported in a graph as curve 12 in FIG. 10.

EXAMPLE 16 (COMPARATIVE)

The test of example 15 is repeated, by using a pellet of powder according to example 3, having the same size as the pellet of example 15. The results of the test are reported in a graph as curve 13 in FIG. 10.

EXAMPLE 17

The test of example 15 is repeated, by using this time CO as the test gas. The results of the test are reported in a graph as the curve 14 in FIG. 11.

EXAMPLE 18 (COMPARATIVE)

The test of example 17 is repeated, by using a pellet of powder of example 3 having the same size of the pellet of example 17. The results of the test are reported in a graph as curve 15 in FIG. 11.

Figure 9:
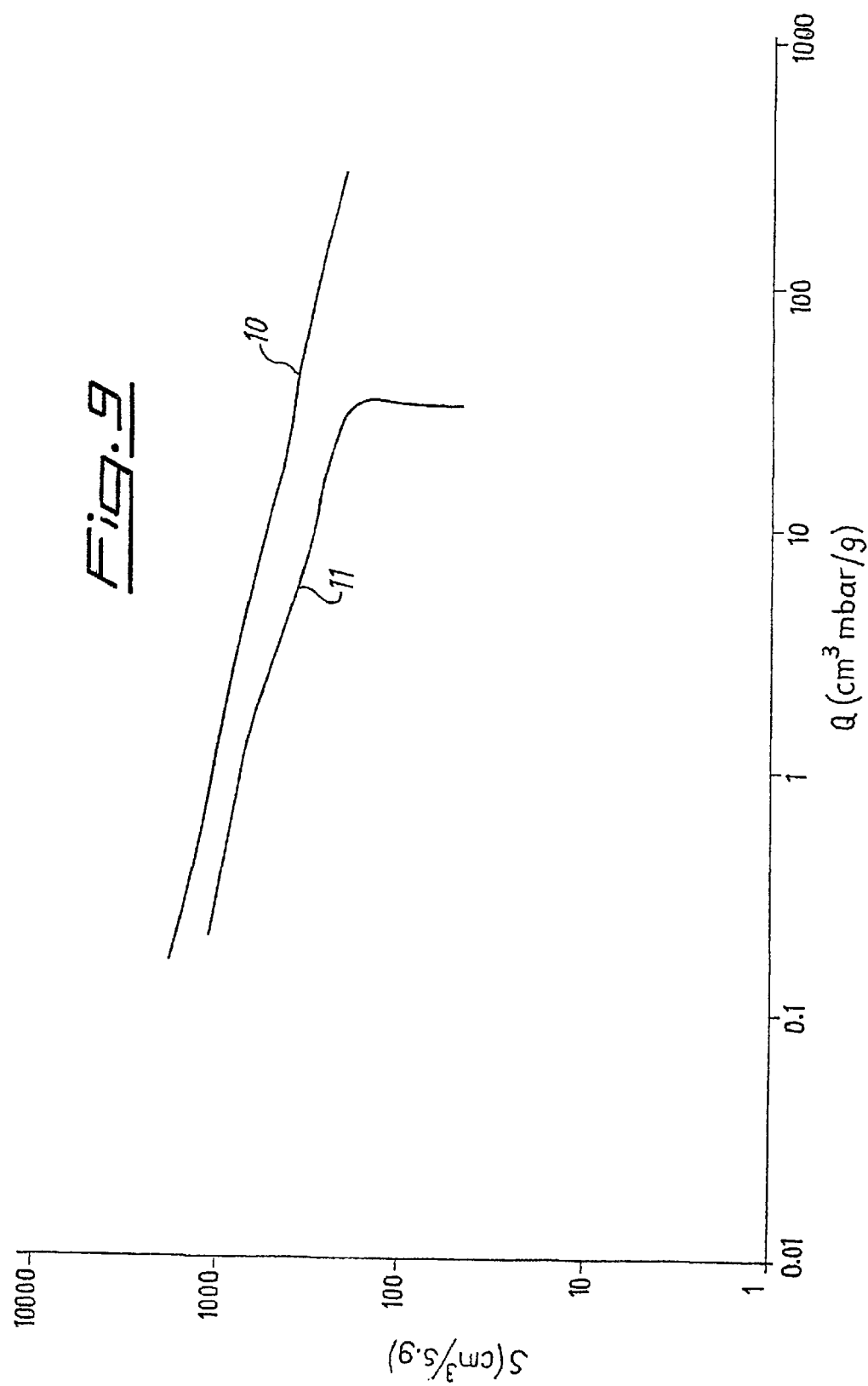

A particularly important factor for evaluating a NEG alloy for practical applications, above all when working at room temperature is foreseen, is the sorption capacity at a certain sorption velocity. In fact, in the normal applications the theoretical sorption capacity of the NEG alloys, which is determined as the stoichiometric completion of the reaction between the metal components and the sorbed gases, is never reached, and generally the lower is the working temperature, the smaller is the degree of progress of said reaction. Therefore, from the practical point of view, it is assumed as the capacity of a getter alloy the one at which its sorption velocity has decreased, from the initial value, to a minimum value acceptable for the application; further, it is assumed that this minimum value is equal to the velocity with which the gases penetrate inside the evacuated space, because of release or permeation from the walls; in the case of applications in purification, said minimum value must be at least equal to the flow of the impurities which come onto the alloy. These practical conditions ensure that the getter alloy is able to absorb completely the quantity of gaseous impurities with which it is in contact. By analyzing the results of the tests it can be noticed that the alloys of the invention have gas sorption properties better than the alloy St 707; particularly, the capacity for nitrogen at room temperature is about 5–15 times greater than the alloy St 707 in the case of loose powders (FIG. 6), and about 3–5 times greater in the case of pellets (FIG. 10); the capacity for CO at the room temperature is about 3–5 times greater than for the St 707 alloy in the case of loose powders (FIG. 7) and about 6–10 times greater in the case of pellets (FIG. 11); the capacity for hydrogen of the powder alloys of the invention is better than that of the alloy St 707 at the room temperature (FIG. 8); finally, even at 300° C. powders of an alloy of the invention show nitrogen capacities higher than powders of the alloy St 707 (FIG. 9).

What is claimed is:

1. Non-evaporable getter alloys having high gas sorption efficiency, particularly for nitrogen, comprising zirconium, vanadium, iron, manganese and at least one element selected among yttrium, lanthanum and Rare Earths, having a weight percent composition of the elements which can vary within the following ranges:

zirconium from 60 to 85%;

vanadium from 2 to 20% iron from 0.5 to 10%;

manganese from 2.5 to 30%; and yttrium, lanthanum, Rare Earths or mixtures thereof from 1 to 6%.

2. Alloys according to claim 1, wherein the weight percentage of zirconium is comprised between about 65 to 75%.

3. Alloys according to claim 2, wherein the weight percentage of zirconium is comprised between about 67 and 70%.

4. Alloys according to claim 1, wherein the weight percentage of vanadium is comprised between about 2.5% and 15%.

5. Alloys according to claim 1, wherein the weight percentage of manganese is comprised between about 5 and 25%.

6. Alloys according to claim 1, wherein the weight ratio between iron and vanadium is between 1:4 and 1:5.

7. An alloy according to claim 1 having the composition Zr 70%-V 15%-Fe 3.3%-Mn 8.7%-mischmetal 3%.

8. An alloy according to claim 1 having the composition Zr 69%-V 2.6%-Fe 0.6%-Mn 24.8%-mischmetal 3%.

9. Getter devices comprising the alloys of claim 1 in powder form.

10. Devices according to claim 9, wherein said alloys have particle size lower than 250 µm.

11. Devices according to claim 9, wherein the powders have particle size comprised between 125 and 40 µm.

12. Devices (10) according to claim 9, formed of pellets made only of powders of the getter alloy.

13. Devices (20) according to claim 9, obtained cutting along parallel lines in the longitudinal direction a band (21) formed of a metal support (22) on which powders (23) of a getter alloy are provided.

14. Devices (30) according to claim 9, formed of powders of a getter alloy (32) inside an upperly open metal container (31).

15. Devices (40) according to claim 9, formed of powders of a getter alloy (42) inside a metal container (41) having an upper opening closed by a porous septum (43).

16. Devices (50) according to claim 15 containing, besides the powders of the getter alloy (51), powders of a moisture sorbing material (52).

17. Thermally insulating manufactured articles comprising an evacuated interspace, wherein the interspace comprises an alloy according to claim 1.

18. Manufactures articles according to claim 17, wherein the interspace contains getter devices according to claim 11.

19. Gas purifiers containing an alloy according to claim 1.

20. Purifiers according to claim 19, containing getter devices according to claim 12.

21. Lamps containing an alloy according to claim 1.

22. Lamps according to claim 21, containing getter devices according to claim 13.

23. Evacuated chambers of inertial energy accumulators containing an alloy according to claim 1.

24. Chambers according to claim 23 containing devices according to claim 15.

25. Chambers according to claim 23 containing devices according to claim 16.

* * * * *